United States Patent
Wood

(10) Patent No.: US 10,216,070 B2
(45) Date of Patent: Feb. 26, 2019

(54) ADJUSTABLE SUPPORT ARM FOR USE BETWEEN CAMERA AND CAMERA SUPPORT

(71) Applicant: Dennis Wood, Thunder Bay (CA)

(72) Inventor: Dennis Wood, Thunder Bay (CA)

(73) Assignee: Cinevate Ltd., Thunder Bay (CA)

( * ) Notice: Subject to any disclaimer, the term of this patent is extended or adjusted under 35 U.S.C. 154(b) by 0 days.

(21) Appl. No.: 15/442,190

(22) Filed: Feb. 24, 2017

(65) Prior Publication Data
US 2017/0293206 A1 Oct. 12, 2017

(51) Int. Cl.
| G03B 17/56 | (2006.01) |
| F16M 11/20 | (2006.01) |
| F16M 13/02 | (2006.01) |
| F16M 11/10 | (2006.01) |
| F16B 2/06 | (2006.01) |
| F16M 11/42 | (2006.01) |

(52) U.S. Cl.
CPC ............ *G03B 17/561* (2013.01); *F16B 2/065* (2013.01); *F16M 11/10* (2013.01); *F16M 11/2021* (2013.01); *F16M 11/425* (2013.01); *F16M 13/02* (2013.01); *F16M 2200/022* (2013.01); *F16M 2200/08* (2013.01)

(58) Field of Classification Search
USPC .......................................................... 396/428
See application file for complete search history.

(56) References Cited

U.S. PATENT DOCUMENTS

| 5,042,763 A | * | 8/1991 | Wong ..................... F16M 13/02 224/265 |
| 6,012,693 A | * | 1/2000 | Voeller ................. F16M 11/048 248/279.1 |
| 6,264,330 B1 | * | 7/2001 | Walton .................... B61C 13/00 104/243 |
| 6,769,657 B1 | * | 8/2004 | Huang ................... F16M 11/10 248/278.1 |
| 7,188,812 B2 | * | 3/2007 | Wang ................. F16M 11/2064 248/276.1 |

(Continued)

OTHER PUBLICATIONS

Stark et al (CA 2894842A1), Recessed Track Lighting Fixture, Sep. 13, 2016.*

*Primary Examiner* — Clayton E. LaBalle
*Assistant Examiner* — Linda B Smith
(74) *Attorney, Agent, or Firm* — Ryan W. Dupuis; Ade & Company Inc.; Kyle R. Satterthwaite

(57) ABSTRACT

A support assembly for supporting a camera relative to a camera support includes an elongate support arm, a first bracket assembly for mounting the camera to the support arm and a second bracket assembly for mounting the support arm to the camera support. Each bracket assembly includes i) a clamp member for clamping onto the support arm, ii) a support member pivotal coupled by a pivot shaft on the clamping member, iii) a mounting member supporting the camera equipment relative to the support member; and iv) a locking member adapted to be coupled between the clamping member and the support member so as to simultaneously fix the mounting member relative to the clamping member at a selected angular position and fix the clamping member relative to the support arm at a selected longitudinal position.

14 Claims, 4 Drawing Sheets

(56) References Cited

U.S. PATENT DOCUMENTS

| | | | | |
|---|---|---|---|---|
| 8,418,900 B1* | 4/2013 | Baker | ............... | A45F 5/00 |
| | | | | 224/262 |
| 9,500,316 B2* | 11/2016 | Terpening | ............ | A45F 5/00 |
| 2008/0029683 A1* | 2/2008 | Draghici | ............ | B60P 3/1066 |
| | | | | 248/640 |
| 2014/0055618 A1* | 2/2014 | Myers | ............ | F16M 11/14 |
| | | | | 348/158 |

* cited by examiner

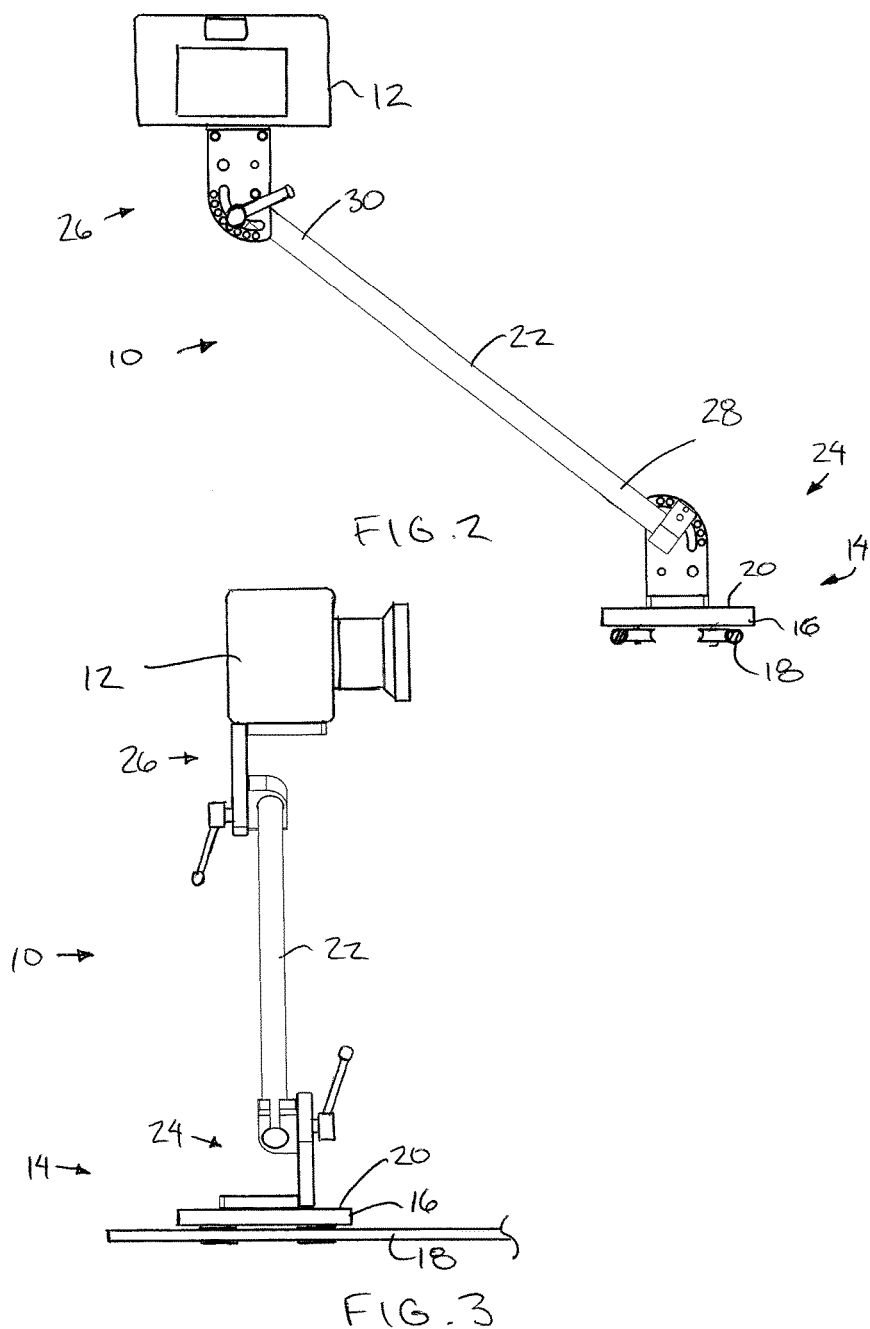

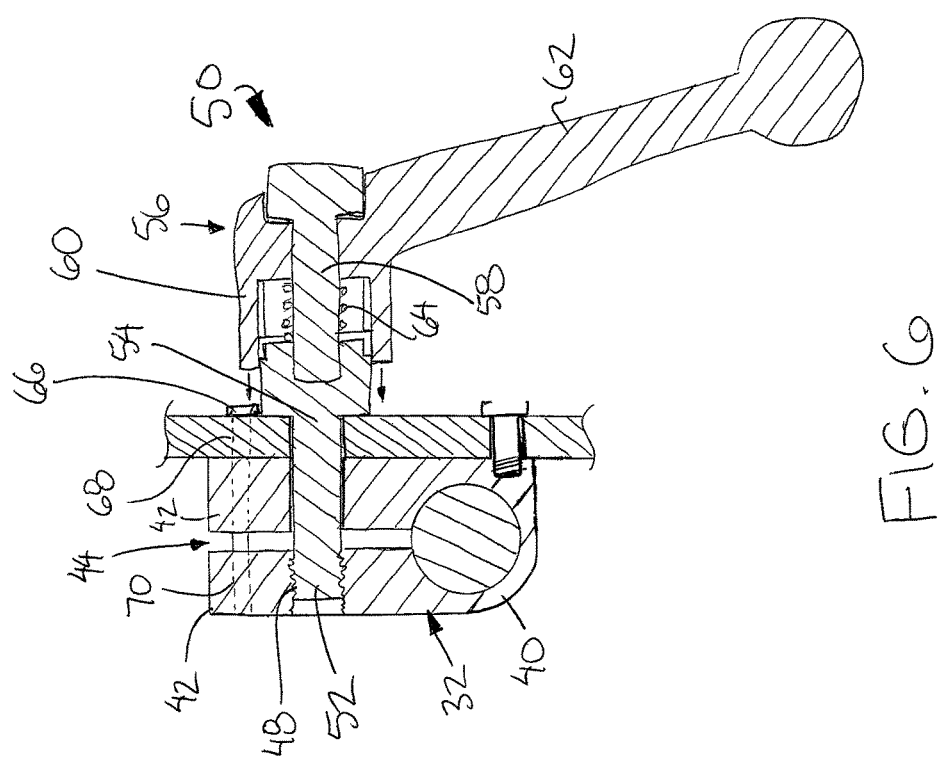

ADJUSTABLE SUPPORT ARM FOR USE BETWEEN CAMERA AND CAMERA SUPPORT

This application claims foreign priority benefits from Canadian Patent Application No. 2,926,490, filed Apr. 11, 2016, the contents of which are hereby incorporated by reference.

FIELD OF THE INVENTION

The present invention relates to an adjustable support assembly including a support arm, a first bracket suitable for mounting on the mounting surface of a camera support, and a second bracket suitable for mounting on the base of a camera, in which the first and second brackets can be mounted on the support arm for angular adjustment and longitudinal sliding adjustment relative to one another. More particularly, the present invention relates to an adjustable support assembly for being adjustably supported between two objects in which the assembly includes first and second brackets mountable to the first and second objects, each bracket being selectively fixed in longitudinal position and angular orientation relative to the support arm by a respective single clamping member.

BACKGROUND

When filming with cameras, it is common to use various types of camera supporting equipment to support a camera, either in a stationary position or to follow various prescribed movements. Various supporting equipment including brackets, rods, clamps and the like can be used in supporting cameras relative to stationary supports such as tripods, or relative to movable camera supports such as track mounted dollies and the like. To provide a desired degree of adjustability in the camera orientation relative to the camera support, a complex arrangement of many brackets, clamps and set screw adjustments would typically be required. This complex arrangement can be costly and time consuming to set up.

SUMMARY OF THE INVENTION

According to one aspect of the invention there is provided a support assembly for supporting a first object relative to a second object, the support assembly comprising:

an elongate support arm extending between longitudinally opposed first and second ends of the support arm which define a longitudinal axis extending therebetween;

a first bracket assembly adapted to be mounted between the first object and the support arm; and a second bracket assembly adapted to be mounted between the second object and the support arm;

wherein at least one of the bracket assemblies comprises:

a clamping member which is arranged to be clamped about the support arm at any one of a plurality of different longitudinal positions within a prescribed range of longitudinal positions along the support arm;

a support member pivotally coupled to the clamping member by a pivot shaft which defines a pivot axis which is perpendicular to the longitudinal axis of the support arm such that the support member is pivotal relative to the clamping member through a prescribed range of angular positions;

a mounting member mounted on the support member for pivotal movement together with the support member relative to the clamping member in which the mounting member is adapted to be coupled to the respective one of the first and second objects; and a locking member adapted to be coupled between the clamping member and the support member so as to simultaneously fix the mounting member relative to the clamping member at a selected one of the angular positions within said prescribed range of angular positions and fix the clamping member relative to the support arm at a selected one of the longitudinal positions within said prescribed range of longitudinal positions.

By providing a singular, angularly adjustable bracket assembly for connection to each one of a camera body and a camera support, a simple and effective means of supporting a camera body relative to a camera support (such as a tripod or track mounted dolly) can be achieved. By further providing a singular locking member which sets both the angular orientation and longitudinal position of each bracket member relative to a common support arm or rod, the angle and position of a camera can be quickly and effectively secured by an operator of the camera with minimal interaction with the support assembly.

According to a second aspect of the present invention there is provided a support assembly for use with a camera support having a mounting surface and a camera having a base adapted to be mounted on said mounting surface, the support assembly comprising:

an elongate support arm extending between longitudinally opposed first and second ends of the support arm which define a longitudinal axis extending therebetween;

a first bracket assembly including a mounting plate adapted to be mounted onto the mounting surface of the camera support and a pivot assembly supporting the mounting plate on the support arm such that the mounting plate adapted to be fixed relative to the support arm at any one of a plurality of different angles relative to the longitudinal axis of the support arm within a prescribed range of different angles;

a second bracket assembly including a mounting plate adapted to be mounted onto the base of the camera and a pivot assembly supporting the mounting plate on the support arm such that the mounting plate is adapted to be fixed relative to the support arm at any one of a plurality of different angles relative to the longitudinal axis of the support arm within a prescribed range of different angles;

whereby the support assembly is adapted to be supported between the base of the camera and the mounting surface of the camera support such that the camera can be supported relative to the camera support through a range of different heights and orientations.

Preferably the pivot assembly of at least one of the first and second bracket assemblies is adapted to be fixed relative to the support arm at any one of a plurality of different longitudinal positions along the longitudinal axis of the support arm.

Preferably the pivot assembly of each of the first and second bracket assemblies is adapted to be fixed relative to the support arm at any one of a plurality of different longitudinal positions along the longitudinal axis of the support arm.

Preferably the first and second bracket assemblies are identical to one another.

Preferably the mounting plate of each bracket assembly is pivotal relative to the support arm between a perpendicularly orientation and a parallel orientation relative to the longitudinal axis of the support arm.

Preferably at least one of the bracket assemblies is adapted to be mounted on the support arm in either one of two opposing first and second orientations in which the mounting plate is pivotal from the perpendicular orientation to the parallel orientation in a first direction of rotation about a respective pivot axis in the first orientation on the support arm and in which the mounting plate is pivotal from the perpendicular orientation to the parallel orientation in a second direction of rotation about said pivot axis opposite to the first direction of rotation.

Preferably both bracket assemblies are adapted to be mounted on the support arm in the opposing first and second orientations.

Preferably the pivot assembly of each bracket assembly includes a clamping member adapted to be clamped about the support arm and a support member pivotally coupled to the clamping member and supporting the mounting plate thereon, the support member includes an arcuate slot formed therein which defines the respective prescribed range of different angles.

Preferably the support member of each bracket assembly further includes a series of locking apertures at spaced apart positions along a curved path alongside the arcuate slot.

Preferably at least one of the bracket assemblies comprises: i) a clamping member which is generally C-shaped between two opposing ends so as to be arranged to clamped about the support arm at any one of a plurality of different longitudinal positions along the support arm; ii) a support plate pivotally coupled to the clamping member by a pivot shaft of the pivot assembly which defines a pivot axis which is perpendicular to the longitudinal axis of the support arm; iii) the mounting plate being mounted on the support plate for pivotal movement together with the support plate relative to the clamping member; and iv) a locking member adapted to be coupled between the clamping member and the support plate so as to simultaneously fix the mounting plate relative to the clamping member and fix the clamping member relative to the support arm.

Preferably the locking member comprises a threaded shaft extending through co-operating apertures in the clamping member and the support member and a head at one end of the shaft arranged to simultaneous clamp the clamping member about the support arm and clamp the support member against the clamping member.

Preferably both of the bracket assemblies include said locking member adapted to be coupled between the clamping member and the support plate so as to simultaneously fix the mounting plate relative to the clamping member and fix the clamping member relative to the support arm.

The camera support may comprise i) a tripod, ii) a wheeled frame supporting the support assembly and the camera thereon for rolling movement along a track, or iii) any other suitable frame typically adapted for supporting a camera thereon relative to a supporting surface.

One embodiment of the invention will now be described in conjunction with the accompanying drawings in which:

BRIEF DESCRIPTION OF THE DRAWINGS

FIG. 2 is an end elevational view of the camera support assembly coupled between a camera slider and a camera body;

FIG. 3 is a side elevational view of the camera support assembly coupled between the camera slider and the camera body according to FIG. 2;

FIG. 6 is sectional view through a portion of one of the bracket assemblies.

In the drawings like characters of reference indicate corresponding parts in the different figures.

DETAILED DESCRIPTION

Figure 1:
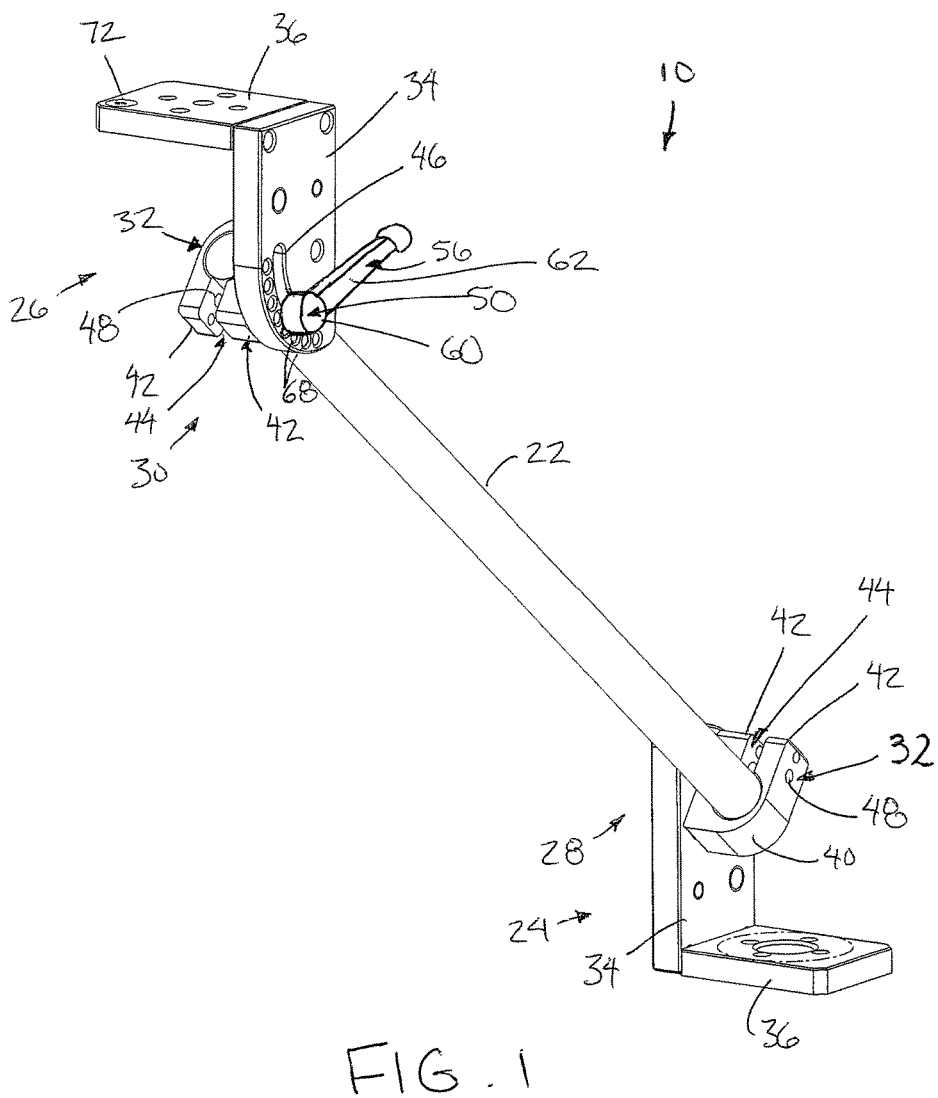
FIG. 1 is a perspective view of the camera support assembly.
Figure 4:
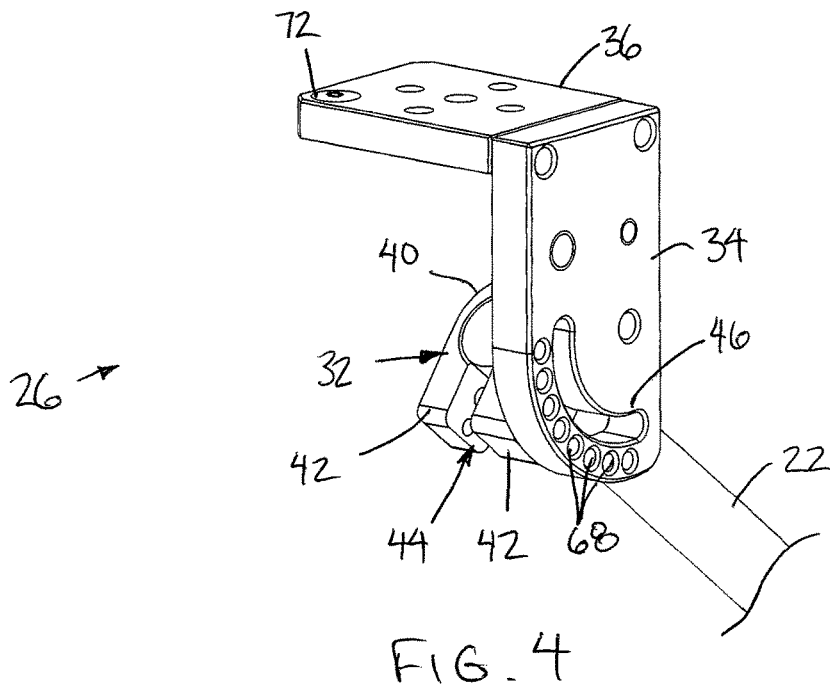
FIG. 4 is a perspective view of one of the bracket assemblies.
Figure 5:
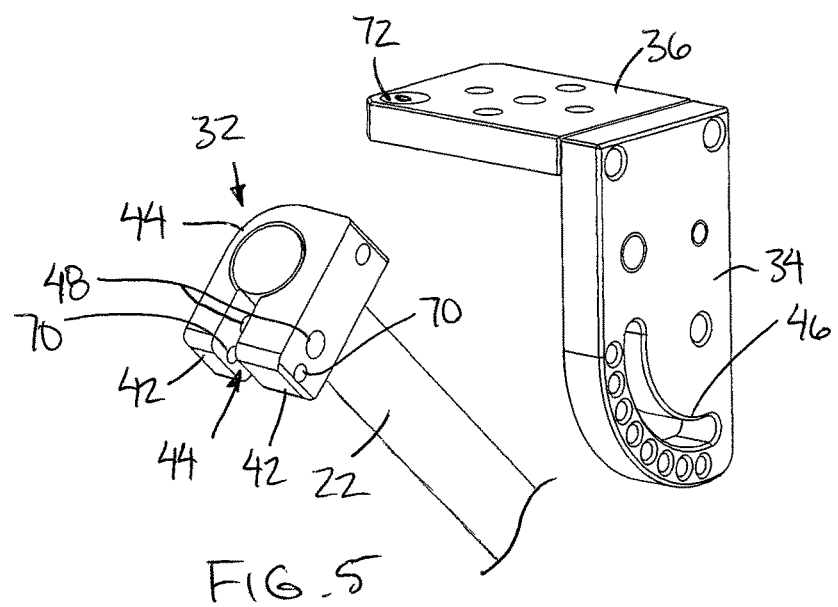
FIG. 5 is an exploded perspective view of the bracket assembly of FIG. 4.

Referring to the accompanying figures, there is illustrated a support assembly 10 which is particularly suited for use with various types of camera equipment.

In the illustrated embodiment, the support assembly 10 is used to support a camera body 12 of a camera of the type typically suited for capturing video or still pictures and which includes a base having a conventional threaded mount therein. The support assembly supports the camera body 12 relative to a camera support 14, such as a camera dolly 16 supported for rolling movement along a track 18.

The camera dolly 16 includes a mounting surface 20, for example a plate including a plurality of fastener apertures therein which are suitably sized for receiving a threaded screw of the type which can be mounted within the threaded mount on the base of the camera body. The mounting surface of the camera dolly is thus suited for supporting various camera body types clamped directly thereon.

The support assembly 10 generally includes i) a support arm 22, ii) a first bracket assembly 24 suited for adjustably coupling the support arm to the mounting surface 20 of the camera support, and iii) a second bracket assembly 26 for adjustably coupling the base of the camera body to the support arm. Each of the first and second bracket assemblies is adjustable through a range of prescribed longitudinal positions relative to the support arm and through a range of angular orientations relative to a longitudinal axis of the support arm.

The support arm 22 comprises an elongate rigid member which is linear between a first end 28 and a second end 30 so as to define a longitudinal axis extending therebetween. The support arm is a rod which is round in cross section and may be formed of metal. Optionally, the rod may be formed of carbon fibre material so as to remain rigid yet be lighter in weight than a comparable metal rod.

Each of the first and second bracket assemblies 24 and 26 includes a clamping member 32 for clamping onto the support arm 22, a support member 34 which is pivotally supported on the clamping member 32, and a mounting member 36 on the support member onto which the relevant camera equipment can be fastened.

Each clamping member 32 comprises a generally C-shaped body defining a central bore 38 therein having an inner diameter which corresponds approximately to the outer diameter of the circular cross-section of the support arm 22 for receiving the rod longitudinally slidable therein. The C shaped body about the central bore is formed of rigid material as a singular, unitary, seamless body of material. The body of the clamping member includes a main portion 40 extending circumferentially about the bore between two opposing end portions 42 which are opposed from one another in the circumferential direction about a central axis of the bore 38. A gap 44 is formed in the body of the clamping member to extend radially from the central bore to the exterior of the body between the two end portions 42 to define the C shape of the body. The main portion 40 of the clamping member is thinner between the inner surface of the bore and the corresponding outer surface of the body in the radial direction than the two end portions of the body so as to be slightly more flexible at the main portion 40. In this manner applying a force to pull the two end portions 42 towards one another in the circumferential direction effectively reduces the inner circumference of the central bore area of the body for clamping the body frictionally about the support arm received longitudinally therethrough.

The support member 34 comprises a rectangular rigid plate which is pivotally coupled to the clamping member 32 at the main portion 40 thereof at a location farthest from the gap 44 in the body of the clamping member. The support member 34 is pivotally coupled by a pivot shaft which is oriented perpendicularly to the central axis of the bore and the longitudinal axis of the support arm received therethrough as well as being perpendicular to the plate. Accordingly the support member 34 is oriented so as to be parallel to the longitudinal axis of the rod throughout the pivotal movement of the plate relative to the support rod.

The mounting member 36 comprises a rigid rectangular plate which is mounted perpendicularly at one end of the support member plate 34 such that the two plates collectively form an L-shaped bracket. The mounting member 36 projects from the same side of the support member plate that the clamping member is mounted against. The mounting member 36 includes fastener apertures therein so as to be suitably arranged for receiving mounting screws inserted therethrough for clamping the base of a camera body to the mounting member, or alternatively for fastening the mounting member 36 to the mounting surface of a variety of different types of camera supports.

The support member 34 includes an arcuate slot 46 therein having a radius of curvature which is centred on the pivot axis of the pivot shaft coupling the support member to the clamping member. A clamping bore 48 is formed through both end portions of the clamping member to extend fully through the body of the clamping member in a direction which is parallel to the pivot axis at the same radial distance from the pivot axis as the arcuate slot such that the arcuate slot is aligned with the pivot axis throughout a prescribed range of angular orientations of the mounting member and support member relative to the clamping member. More particularly the arcuate slot is aligned with the clamping bore 48 as the mounting member plate is pivoted from an orientation perpendicular to the longitudinal axis of the support arm to an orientation which is parallel to the longitudinal axis of the support arm.

A locking member 50 is provided in the form of a fastener inserted through the arcuate slot and into the corresponding clamping bores 48 of the clamping member 32. The locking member is operable from an engaged position to a disengaged position. In the engaged position the support member is clamped tightly against an inner side of the clamping member and the end portion at the outer side of the clamping member is pulled towards the inner end portion 42 to sufficiently frictionally clamp the support arm within the clamping member. In this manner actuation of a single locking member serves to simultaneously i) fix the angular orientation of the mounting member and support member relative to the clamping member and ii) fix the longitudinal position of the clamping member along the support arm.

In the disengaged position the locking member is sufficiently loosened relative to the clamping member and support member that the clamping member can be freely rotated about the support arm and longitudinally slidably displaced along the support arm. Simultaneously the support member and mounting member are freely pivotal relative to the clamping member within the prescribed range of angular orientations defined by the locking member being slidably displaced between opposing ends of the arcuate slot receiving the locking member therethrough.

The locking member 50 generally comprises an elongate shaft having a first end 52 which is externally threaded for forming a threaded connection into internal threads on the portion of the clamping bore 48 within the outermost one of the two end portions 42 farthest from the support member 34. A head is mounted at the opposing second end 54 which serves to engage the outer surface of the support member plate opposite the clamping member such that threaded engagement at the first end 52 in a tightening direction causes the head at the second end 54 to clamp the support member against the clamping member while simultaneously drawing the two end portions of the clamping member towards one another for clamping about the support arm. As shown in the Figures and described above, the shaft of the locking member is oriented in a tangential direction relative to a circumference of the support arm so that the shaft is parallel to and spaced from the pivot axis of the support member such that actuation of the locking member simultaneously fixedly clamps the support member against the clamping member to fix the mounting member at a selected one of the angular positions within said prescribed range of angular positions and fixedly clamp the clamping member circumferentially about the support arm to fix the clamping member relative to the support arm at a selected one of the longitudinal positions within said prescribed range of longitudinal positions.

Actuation of the locking member 50 is provided by a handle member 56 mounted on an axial shaft 58 protruding axially from the head at the second end 54 of the main shaft of the locking member. The handle member 56 includes a cap portion 60 which is axially slidable along the shaft 58 between an outermost position in which the handle member is freely rotatable about the shaft 58 relative to the head 54 of the main shaft, and an innermost position in which an interlocking feature on an inner surface of the cap portion 60 mates with a corresponding interlocking feature on the head 54 of the main shaft such that the cap portion 60 and the head 54 are interlocked for rotation together to tighten or loosen the threads at the first end 52. A lever arm 62 extends axially outward from the cap portion to provide additional leverage to tighten or loosen the main shaft relative to the clamping member. A spring member 64 is provided within the cap portion in engagement between the handle 56 and the head 54 of the main shaft to bias the handle outwardly into the disengaged position. The lever arm 62 thus provides leverage for tightening the locking member 50 into the engaged position when desired.

When it is desired to provide additional support to retain one of the bracket assemblies in a fixed angular orientation, an additional locking pin or bolt 66 can be inserted through cooperating apertures in the clamping member and the support member respectively at a location spaced further radially outward from the pivot axis than the arcuate slot and the clamping bore 48. More particularly a row of apertures 68 is provided in the support member along an arcuate shaped row at a common radial distance from the pivot shaft, alongside the arcuate slot 46. The apertures are spaced apart in a circumferential direction relative to the pivot axis at a common radial distance from the pivot shaft as a corresponding locking bore 70 in the clamping member 32 so as to enable the bolt 66 to be inserted through a selected one of the apertures 68 and the locking bore 70 to prevent relative rotation between the support member and the clamping member. The outermost end portion 42 of the clamping member farthest from the support member may be internally threaded for forming a threaded connection with the bolt 66 to enable clamping of the clamping member about the support arm in the absence of the locking member 50.

The support assembly 10 can accordingly be used by mounting in between the mounting surface of a camera support and the base of a camera body such that the camera body is adjustable through a range of heights and angular orientations relative to the camera support by adjusting longitudinal position and angular orientation of one or both brackets relative to the support arm of the assembly. The mounting member plate of each bracket assembly can be pivoted through a range of approximately 90° relative to the support arm, however the clamping member can be rotated through 180° relative to the circular cross-section of the support arm by spinning the bracket through 180° about the longitudinal axis of the support arm, or reversing the bracket end to end in the manner in which it is mounted on the support arm, to increase the range of positions and angular orientations of the mounting member relative to the support arm.

Typically the mounting members of the two bracket assemblies are initially fastened to the base of the camera body and the mounting surface of a camera support respectively during initial setup. While the user manually supports the camera body, one or both of the locking members 50 can be released into the disengaged position thereof to enable free movement of position and angular orientation of the camera relative to the camera support by pivoting the brackets relative to the support arm and longitudinally sliding the brackets relative to the support arm. When the camera is located in an optimal orientation, the user tightens both locking members into their respective engaged positions using the handle members 56 thereof.

A level bubble 72, in the form of a glass dome locating a liquid with a pocket of air therein, is recessed into a bore within the mounting member plate so as to provide a visual indication as to what degree the mounting member plate is in a horizontal and level orientation.

Although the support assembly 10 is shown for supporting a camera relative to a camera support in the illustrated embodiment, the advantages of a single actuation of a locking member for fixing both angular orientation and longitudinal position of a mounting plate relative to a support arm can be realized even when using an assembly with only one adjustable bracket on the support arm, or alternatively when using the support assembly to support other objects relative to a suitable supporting surface. In one example a video monitor may be supported relative to a supporting surface by fastening the mounting member plate of one bracket to the supporting surface and fastening the mounting member plate of the other bracket to the base of the video monitor.

Since various modifications can be made in my invention as herein above described, and many apparently widely different embodiments of same made, it is intended that all matter contained in the accompanying specification shall be interpreted as illustrative only and not in a limiting sense.

The invention claimed is:

1. A support assembly for use with a camera support having a mounting surface and a camera having a base adapted to be mounted on said mounting surface, the support assembly comprising:
   an elongate support arm extending between longitudinally opposed first and second ends of the support arm which define a longitudinal axis extending therebetween;
   a first bracket assembly including a mounting plate adapted to be mounted onto the mounting surface of the camera support and a pivot assembly supporting the mounting plate on the support arm such that the mounting plate adapted to be fixed relative to the support arm at any one of a plurality of different angles relative to the longitudinal axis of the support arm within a prescribed range of different angles;
   a second bracket assembly including a mounting plate adapted to be mounted onto the base of the camera and a pivot assembly supporting the mounting plate on the support arm such that the mounting plate is adapted to be fixed relative to the support arm at any one of a plurality of different angles relative to the longitudinal axis of the support arm within a prescribed range of different angles;
   whereby the support assembly is adapted to be supported between the base of the camera and the mounting surface of the camera support such that the camera can be supported relative to the camera support through a range of different heights and orientations;
   wherein the pivot assembly of at least one of the first and second bracket assemblies further comprises:
      a clamping member which mates with the support arm so as to be supported for linear sliding movement between a plurality of different longitudinal positions along the longitudinal axis of the support arm;
      a support member coupled to the clamping member by a pivot which defines a pivot axis that is perpendicular to the longitudinal axis of the support arm about which the support member is pivotal relative to the clamping member;
      the mounting plate being mounted on the support member so as to be pivotal together about the pivot axis relative to the clamping member; and
      a locking member coupled between the clamping member and the support member which is operable between an engaged position and a disengaged position;
      in the engaged position, the clamping member being frictionally fixed relative to the support arm by the locking member and the support member being frictionally fixed relative to the clamping member by the locking member; and
      in the disengaged position, the clamping member being linearly slidable along the support arm and the support member being pivotal about the pivot axis relative to the clamping member;
      whereby the locking member is adapted to simultaneously fix the support member relative to the clamping member and fix the clamping member relative to the support arm as the locking member is displaced from the disengaged position to the engaged position.

2. A support assembly for supporting a first object relative to a second object, the support assembly comprising:
   an elongate support arm extending between longitudinally opposed first and second ends of the support arm which define a longitudinal axis extending therebetween;
   a first bracket assembly adapted to be mounted between the first object and the support arm; and
   a second bracket assembly adapted to be mounted between the second object and the support arm;
   wherein at least one of the bracket assemblies comprises:
      a clamping member which is arranged to be clamped circumferentially about the support arm at any one of a plurality of different longitudinal positions within a prescribed range of longitudinal positions along the support arm;

a support member pivotally coupled to the clamping member by a pivot shaft which defines a pivot axis which is perpendicular to the longitudinal axis of the support arm such that the support member is pivotal relative to the clamping member about the pivot axis of the pivot shaft through a prescribed range of angular positions, the support member including an arcuate shaped slot formed therein that has a center of curvature at the pivot axis of the pivot shaft;

a mounting member mounted on the support member for pivotal movement together with the support member relative to the clamping member in which the mounting member is adapted to be coupled to the respective one of the first and second objects; and a locking member coupled between the clamping member and the support member;

the locking member having an elongate shaft oriented in a tangential direction relative to a circumference of the support arm so that the elongate shaft is parallel to and spaced from the pivot shaft defining the pivot axis of the support member, the elongate shaft of the locking member being received within the arcuate slot of the support member so as to be displaced along the arcuate slot as the support member is pivoted about the pivot axis of the pivot shaft relative to the clamp member and so as to define the prescribed range of angular positions of the support member relative to the clamping member; and the locking member being actuable so as to simultaneously (i) fixedly clamp the support member against the clamping member at the arcuate slot to fix the mounting member at a selected one of the angular positions within said prescribed range of angular positions and (ii) fixedly clamp the clamping member circumferentially about the support arm to fix the clamping member relative to the support arm at a selected one of the longitudinal positions within said prescribed range of longitudinal positions.

3. The support assembly according to claim 2 wherein the pivot assembly of each of the first and second bracket assemblies is adapted to be fixed relative to the support arm at any one of a plurality of different longitudinal positions along the longitudinal axis of the support arm.

4. The support assembly according to claim 2 wherein the first and second bracket assemblies are identical to one another.

5. The support assembly according to claim 2 wherein the mounting plate of each bracket assembly is pivotal relative to the support arm between a perpendicular orientation and a parallel orientation relative to the longitudinal axis of the support arm.

6. The support assembly according to claim 2 wherein the locking member comprises a threaded shaft extending through co-operating apertures in the clamping member and the support member and a head at one end of the shaft arranged to simultaneous clamp the clamping member about the support arm and clamp the support member against the clamping member.

7. The support assembly according to claim 2 in combination with the camera support and the camera, wherein the camera support comprises a wheeled frame supporting the support assembly and the camera thereon for rolling movement.

8. The support assembly according to claim 2 wherein elongate shaft of the locking member comprises a threaded shaft extending through co-operating apertures in the clamping member and the support member and a head at one end of the shaft so as to be arranged to simultaneous clamp the clamping member about the support arm and clamp the support member against the clamping member.

9. The support assembly according to claim 2 wherein the clamping member of said at least one of the bracket assemblies is adapted to be mounted on the support arm in either one of two opposing first and second orientations in which the mounting plate is pivotal from a perpendicular orientation to a parallel orientation relative to the longitudinal axis of the support arm in a first direction of rotation about a respective pivot axis in the first orientation on the support arm and in which the mounting plate is pivotal from the perpendicular orientation to the parallel orientation in a second direction of rotation about said pivot axis opposite to the first direction of rotation.

10. The support assembly according to claim 2 wherein the support member of said at least one of the bracket assemblies further includes a series of locking apertures at spaced apart positions along a curved path alongside the arcuate slot.

11. The support assembly according to claim 5 wherein at least one of the bracket assemblies is adapted to be mounted on the support arm in either one of two opposing first and second orientations in which the mounting plate is pivotal from the perpendicular orientation to the parallel orientation in a first direction of rotation about a respective pivot axis in the first orientation on the support arm and in which the mounting plate is pivotal from the perpendicular orientation to the parallel orientation in a second direction of rotation about said pivot axis opposite to the first direction of rotation.

12. The support assembly according to claim 6 wherein both of the bracket assemblies include said locking member adapted to be coupled between the clamping member and the support member so as to simultaneously fix the mounting plate relative to the clamping member and fix the clamping member relative to the support arm.

13. The support assembly according to claim 7 wherein the wheeled frame is supported for rolling movement along a track.

14. The support assembly according to claim 11 wherein both bracket assemblies are adapted to be mounted on the support arm in the opposing first and second orientations.

\* \* \* \* \*